US011279792B2

(12) United States Patent
Goto et al.

(10) Patent No.: US 11,279,792 B2
(45) Date of Patent: Mar. 22, 2022

(54) METHOD FOR PRODUCING A BIOPOLYETHER POLYOL, BIOPOLYETHER POLYOL, AND BIOPOLYURETHANE RESIN

(71) Applicant: Hodogaya Chemical Co., Ltd., Tokyo (JP)

(72) Inventors: Yohei Goto, Tokyo (JP); Tsuyoshi Sato, Tokyo (JP); Yuo Maruyama, Tokyo (JP)

(73) Assignee: HODOGAYA CHEMICAL CO., LTD., Tokyo (JP)

( * ) Notice: Subject to any disclaimer, the term of this patent is extended or adjusted under 35 U.S.C. 154(b) by 213 days.

(21) Appl. No.: 16/617,970

(22) PCT Filed: Mar. 29, 2018

(86) PCT No.: PCT/JP2018/013321
§ 371 (c)(1),
(2) Date: Nov. 27, 2019

(87) PCT Pub. No.: WO2018/220983
PCT Pub. Date: Dec. 6, 2018

(65) Prior Publication Data
US 2020/0087439 A1 Mar. 19, 2020

(30) Foreign Application Priority Data
May 30, 2017 (JP) .............................. JP2017-106345

(51) Int. Cl.
C08G 65/20 (2006.01)
C08G 18/48 (2006.01)
(Continued)

(52) U.S. Cl.
CPC ..... C08G 18/4858 (2013.01); C08G 18/3206 (2013.01); C08G 18/6674 (2013.01); C08G 18/7671 (2013.01); C08G 65/20 (2013.01)

(58) Field of Classification Search
CPC ................ C08G 65/20; C08G 18/4858; C08G 18/3206; C08G 18/7671
See application file for complete search history.

(56) References Cited

U.S. PATENT DOCUMENTS 3,631,199 A 12/1971 Smith et al.
4,960,849 A 10/1990 Okabe et al.
(Continued)

FOREIGN PATENT DOCUMENTS

CN 103755948 A 4/2014
JP 48-6957 B1 3/1973
(Continued)

OTHER PUBLICATIONS

JP-07165849-A_06-1995_English.*
(Continued)

Primary Examiner — Michael L Leonard
(74) Attorney, Agent, or Firm — Fitch, Even, Tabin & Flannery, LLP

(57) ABSTRACT

The present invention relates to a method for producing a biopolyether polyol, which is a copolymerization reaction of tetrahydrofuran and 2-methyltetrahydrofuran in a monomer ratio (by mass) of 85/15 to 50/50, and the resulting polyether polyol of 100% plant origin having a number-average molecular weight of 500-5000. In addition, a polyurethane resin, which is the product of a synthetic reaction having as the main reactants the above polyether polyol of 100% plant origin, a polyisocyanate compound, and a chain extender that reacts with isocyanate groups, has a change in storage modulus (E') in the low temperature range (0° C.) with respect to normal temperature (20° C.) of within 0-15%.

8 Claims, 2 Drawing Sheets

(51) Int. Cl.
*C08G 18/32* (2006.01)
*C08G 18/66* (2006.01)
*C08G 18/76* (2006.01)

(56) References Cited

U.S. PATENT DOCUMENTS

| | | | |
|---|---|---|---|
| 6,503,996 B1 * | 1/2003 | Bretches | D01F 6/70 528/49 |
| 2003/0166821 A1 * | 9/2003 | Pruckmayr | C08G 65/20 528/44 |
| 2010/0099895 A1 | 4/2010 | Wabnitz et al. | |
| 2011/0207910 A1 | 8/2011 | Sun | |
| 2016/0326316 A1 * | 11/2016 | Dorai | C08G 65/2615 |
| 2017/0253698 A1 | 9/2017 | Taniguchi et al. | |

FOREIGN PATENT DOCUMENTS

| | | |
|---|---|---|
| JP | S63-235320 A | 9/1988 |
| JP | H01-284518 A | 11/1989 |
| JP | 07165849 A * | 6/1995 |
| JP | 2001-11732 A | 1/2001 |
| JP | 2006-144192 A | 6/2006 |
| JP | 2010-531839 A | 9/2010 |
| JP | 2011-225863 A | 11/2011 |
| JP | 2013-502507 A | 1/2013 |
| JP | 2017-025282 A | 2/2017 |
| JP | 2017-506083 A | 3/2017 |
| WO | 2015/126581 A | 8/2015 |

OTHER PUBLICATIONS

Extended European Search Report (EESR) in counterpart EP Application No. 18809008.8 dated Nov. 30, 2020.
International Search Report for PCT/JP2018/013321 dated Jun. 19, 2018, and translation submitted herewith (9 pages).

* cited by examiner

METHOD FOR PRODUCING A BIOPOLYETHER POLYOL, BIOPOLYETHER POLYOL, AND BIOPOLYURETHANE RESIN

CROSS-REFERENCE TO RELATED APPLICATIONS

This application is a U.S. national phase application filed under 35 U.S.C. § 371 of International Application No. PCT/JP2018/013321, filed Mar. 29, 2018, designating the United States, which claims priority from Japanese Patent Application No. 2017-106345, filed May 30, 2017, which are hereby incorporated herein by reference in their entirety.

TECHNICAL FIELD

The present invention relates to a biopolyether polyol from a copolymerization reaction of tetrahydrofuran and 2-methyltetrahydrofuran and to a method for producing the same. Further, it relates to a biopolyurethane resin produced using the polyether polyol, which resin is a reaction product of the polyether polyol and an organic polyisocyanate component.

BACKGROUND ART

A polyether is commonly used as a soft segment component of a polyurethane resin. Especially, a polyurethane resin using polytetramethylene ether glycol, which is a polymer of tetrahydrofuran, is excellent in respect of elastic properties, low-temperature properties, hydrolytic resistance and others, and therefore has attracted attention particularly in the elastic fibers and CASE applications.

However, a polyurethane resin using polytetramethylene ether glycol is poor in its flexibility in a low-temperature region due to the crystalline properties of the soft segment. For solving the problem, there has been proposed a polyol having noncrystalline properties enhanced, obtained by introducing a monomer having a side chain (for example, 3-alkyltetrahydrofuran or neopentyl glycol) into polytetramethylene ether glycol (see patent literatures 1 and 2). In the polyurethane resins using the polyol in these patent literatures, the alkyl side chain of the polyol suppresses crystalline properties of the soft segment, providing excellent flexibility even in a low-temperature region.

Further, in recent years, for achieving a recycling-based society and tackling problems of the depletion of fossil resources, the development of products which do not depend on petroleum but use plant origin raw materials is required socially. With respect to the polyol, which is a raw material of polyurethane, there is a biopolyol produced from a vegetable oil as a raw material, but an optimum biopolyol used in the elastic fibers and CASE applications is limited.

Among biopolyols, polytetramethylene ether glycol using biobutanediol or biotetrahydrofuran as a raw material has drawn attention as a plant origin polyol having physical properties equivalent to those of petroleum-based polyol. However, as mentioned above, the polytetramethylene ether glycol has crystalline properties as a soft segment. When a petroleum-derived monomer having a side chain (for example, 3-alkyltetrahydrofuran) is introduced into the polyol for improving the crystalline properties, the plant origin component concentration (bioconcentration) of the polyol is unpreferably lowered.

CITATION LIST

Patent Literature

Patent Literature 1: JPS63-235320A
Patent Literature 2: JPH01-284518A

SUMMARY OF INVENTION

Technical Problem

The problems to be solved by the present invention are to provide a method for producing a biopolyether polyol from plant origin raw materials, a biopolyether polyol, and a biopolyurethane resin having excellent elastic properties and excellent low-temperature properties.

Solution to Problem

The present inventors have conducted extensive studies for the purpose of solving the above-mentioned problems, and as a result, they have arrived at the present invention. Thus, the present invention is directed to a method for producing a biopolyether polyol, a biopolyether polyol, and a biopolyurethane resin using the same as follows.

[1] A method for producing a biopolyether polyol, comprising the step of producing a plant origin polyether polyol from a copolymerization reaction of tetrahydrofuran and 2-methyltetrahydrofuran, wherein a monomer ratio by mass of the tetrahydrofuran to the 2-methyltetrahydrofuran ranges 85/15 to 50/50.

[2] The method for producing a biopolyether polyol according to item [1], wherein the copolymerization reaction is carried out by adding a strong acid catalyst in an amount of 15 to 40% by mass based on a total mass of the tetrahydrofuran and 2-methyltetrahydrofuran.

[3] The method for producing a biopolyether polyol according to item [1] or [2], wherein the tetrahydrofuran and 2-methyltetrahydrofuran are monomers of 100% plant origin, and wherein the copolymerization reaction is carried out by mixing the monomers in a monomer ratio by mass within the range of from 85/15 to 50/50, and charging a strong acid catalyst thereinto while maintaining a temperature within the range of from 0 to 50° C.

[4] The method for producing a biopolyether polyol according to any one of items [1] to [3], wherein the strong acid catalyst is acetic anhydride, perchloric acid, fluorosulfonic acid, or fuming sulfuric acid.

[5] A 100% plant origin polyether polyol, which is a product of a copolymerization reaction of 100% plant origin tetrahydrofuran and 2-methyltetrahydrofuran, having a monomer ratio by mass of the tetrahydrofuran and the 2-methyltetrahydrofuran of 85/15 to 50/50, and a number average molecular weight of 500 to 5,000.

[6] A biopolyurethane resin, which is a polyurethane resin that is a product of a synthesis reaction of:
 a polyether polyol, which is a product of a copolymerization reaction of tetrahydrofuran and 2-methyltetrahydrofuran, wherein a monomer ratio by mass of the tetrahydrofuran and the 2-methyltetrahydrofuran ranges 85/15 to 50/50;
 a polyisocyanate compound; and
 a chain extender capable of reacting with an isocyanate group of the polyisocyanate compound;

as main reactants,
   wherein the biopolyurethane resin comprises plant origin components in an amount of 50 to 80% by mass, relative to 100% by mass of the polyurethane resin.

[7] The biopolyurethane resin according to item [6], wherein the polyether polyol is a 100% plant origin polyether polyol and has a number average molecular weight of 500 to 5,000.

[8] The biopolyurethane resin according to item [6] or [7], which shows an increase in storage modulus (E') in a low-temperature region at 0° C. with respect to room temperature (20° C.) of within 0 to 15%.

Advantageous Effects of Invention

In the polyether polyol of the present invention, both of tetrahydrofuran (or 1,4-butanediol) and 2-methyltetrahydrofuran, which are raw materials of the polyether polyol, can be of plant origin, and therefore a 100% plant origin polyether polyol can be provided. Further, a biopolyurethane resin, which is obtained using the polyether polyol of the present invention by reacting the polyether polyol with an organic isocyanate compound and a chain extender, is a material having excellent elastic properties and excellent low-temperature properties.

DESCRIPTION OF EMBODIMENTS

Figure 1:
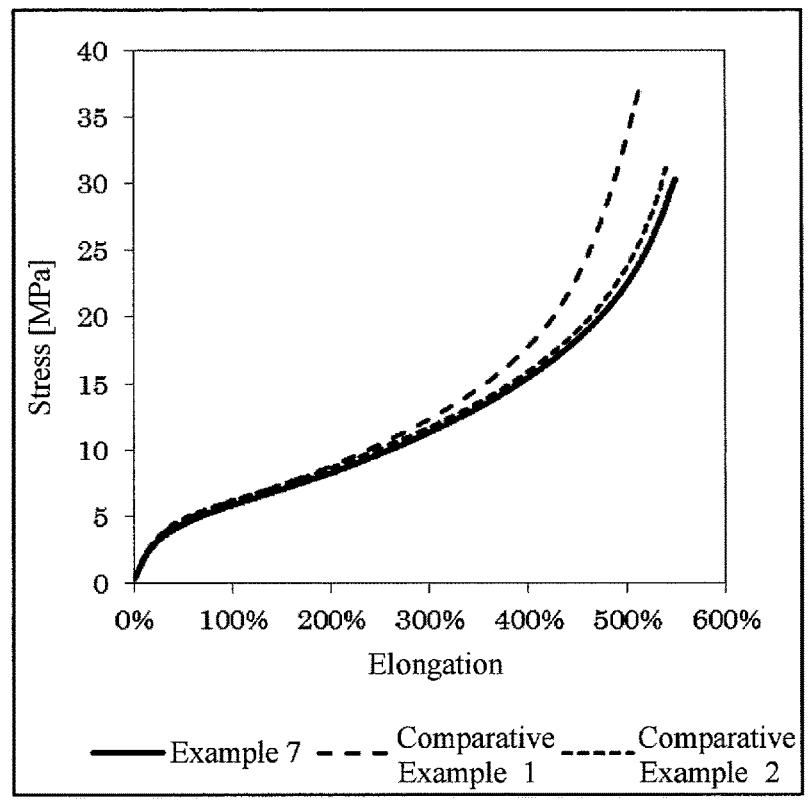
FIG. 1 shows the results of the evaluation of a tensile strength and an elongation with respect to the polyurethane resins in Example 7 and Comparative Examples 1 and 2.

Hereinbelow, the present invention will be described in detail with reference to the following preferred embodiments. In the present description, the terms "biobutanediol", "biotetrahydrofuran", "biopolyol", "biopolyether polyol" and the like refer to plant origin low-molecular-weight or polymer compounds having physical properties equivalent to those of the corresponding petroleum-based compounds. In the present description, the term "100% plant origin polyether polyol" refers to a polyether polyol having a main chain, which is derived from a plant-based compound in its entirety. In the present description, the term "biopolyurethane resin" refers to a polyurethane resin produced from raw materials, at least 50% by mass or more of which have been derived from plant-based compounds.

The method for producing a biopolyether polyol of the present invention is a method for producing a plant origin polyether polyol from a copolymerization reaction of tetrahydrofuran and 2-methyltetrahydrofuran. In the polyether polyol of the present invention, the monomer ratio by mass of the tetrahydrofuran and the 2-methyltetrahydrofuran ranges 85/15 to 50/50. For obtaining a preferred polyether polyol, the tetrahydrofuran/2-methyltetrahydrofuran monomer ratio by mass is within the range of 80/20 to 60/40. A monomer weight ratio of 50/50 or less is not preferred, because 2-methyltetrahydrofuran reacts insufficiently and lowers the yield. To the contrary, when the monomer weight ratio is 85/15 or more, the crystalline properties are increased, and such a monomer ratio is unfit for the aim of desirably modifying the crystalline properties of the soft segment by the alkyl side chain of polyol.

In the copolymerization reaction of tetrahydrofuran and 2-methyltetrahydrofuran in the present invention, a strong acid capable of causing tetrahydrofuran to suffer ring opening may be added in an amount of 15 to 40% by mass, preferably 18 to 36% by mass, based on the total mass of the tetrahydrofuran and 2-methyltetrahydrofuran. When a strong acid is added in an amount of 15% by mass or less, there is a potential risk of reduction of the reaction conversion and lowering of the yield. When a strong acid is added in an amount of 40% by mass or more, there is a potential risk of increasing the reaction active species and lowering of the molecular weight during the reaction in a state of equilibrium.

In the method for producing a biopolyether polyol of the present invention, the tetrahydrofuran and 2-methyltetrahydrofuran are 100% plant origin monomers, and the monomers are mixed so that the monomer ratio by mass is within the range of from 85/15 to 50/50, and a strong acid catalyst is charged into the monomer mixture while maintaining the temperature within the range of from 0 to 50° C. to perform the copolymerization reaction.

In the copolymerization reaction of tetrahydrofuran and 2-methyltetrahydrofuran in the present invention, examples of the strong acids capable of causing tetrahydrofuran to suffer ring opening include acetic anhydride, fluorosulfonic acid, fuming sulfuric acid, and perchloric acid. The strong acid catalyst may be used alone or in combination of two or more. When using two or more types of strong acids, they may be individually used usually in several separate stages of temperature within the range of from 0 to 50° C.

The 100% plant origin polyether polyol of the present invention has a molecular weight of 500 to 5,000. When the molecular weight of the polyether polyol is 500 or less, a polyurethane resin produced from the polyether polyol is so hard that the rubber elasticity and tensile strength are poor. When the molecular weight of the polyether polyol is 5,000 or more, a polyurethane resin produced from the polyether polyol has such a large elongation that the resin properties deteriorate.

Further, the biopolyurethane resin of the present invention is a biopolyurethane resin, which is a polyurethane resin that is a product of a synthesis reaction using, as main reactants, a polyether polyol, which is a product of a copolymerization reaction of tetrahydrofuran and 2-methyltetrahydrofuran, wherein the monomer ratio by mass of the tetrahydrofuran and the 2-methyltetrahydrofuran ranges 85/15 to 50/50; a polyisocyanate compound; and a chain extender capable of reacting with an isocyanate group, wherein the biopolyurethane resin contains plant origin components in an amount of 50 to 80% by mass, relative to 100% by mass of the polyurethane resin.

Examples of the polyisocyanate compound used in the above-mentioned synthesis reaction include compounds having two or more isocyanate groups in the molecule thereof; for example, polyisocyanates, such as tolylene diisocyanate (TDI), diphenylmethane diisocyanate (MDI), xylylene diisocyanate (XDI), isophorone diisocyanate (IPDI), hexamethylene diisocyanate (HDI), naphthalene diisocyanate (NDI), and hydrogenated diphenylmethane diisocyanate; and they are used alone or in combination.

Examples of the chain extenders capable of reacting with an isocyanate group used in the synthesis reaction include compounds having two or more hydroxyl groups or amino groups, such as ethylene glycol, 1,3-propanediol, 1,4-butanediol, 1,5-pentanediol, 1,6-hexanediol, glycerol, trimethylolpropane, ethylenediamine, propylenediamine, phenylenediamine, and diaminodiphenylmethane.

In the synthesis reaction, the polyether polyol, which is a product of a copolymerization reaction of tetrahydrofuran and 2-methyltetrahydrofuran, wherein the monomer ratio by mass of the tetrahydrofuran and the 2-methyltetrahydrofuran ranges 85/15 to 50/50, is a 100% plant origin polyether polyol and has a number average molecular weight of 500 to 5,000. Such a tetrahydrofuran may be produced by, for example, obtaining furfural from corncobs or waste wood materials, subjecting the furfural to decarbonylation to obtain furan, and hydrogenating the furan. Meanwhile, 2-methyltetrahydrofuran is usually synthesized by catalytic hydrogenation of furfural. Furfural may be synthesized from polysaccharides using an acid catalyst. That is, 2-methyltetrahydrofuran may be synthesized from biomass raw materials, such as cellulose, hemicellulose, and lignin, which may be recovered from agricultural waste, such as corncobs and waste remaining after pressing sugarcane. Thus, it is a compound that may be synthesized by an environment-friendly process.

The biopolyurethane resin from the above-mentioned synthesis reaction contains 50 to 80% by mass of a polyol component. That is, the biopolyurethane resin contains a plant origin component in an amount of 50 to 80% by mass, relative to 100% by mass of the polyurethane resin. Generally, the higher the plant origin component content of the resin, the more environment-friendly the resin. However, for achieving the plant origin component content of 80% by mass or more, it is necessary that as large a part as possible of the polyether polyol, which is a product of a copolymerization reaction of tetrahydrofuran and 2-methyltetrahydrofuran, wherein the monomer ratio by mass of the tetrahydrofuran and the 2-methyltetrahydrofuran ranges 85/15 to 50/50, as well as the other main reactants, such as a polyisocyanate compound and a chain extender capable of reacting with an isocyanate group, be of plant origin. Such a high plant origin component content is difficult to achieve by a technique at the current level, and is disadvantageous from the economical viewpoint as well.

The biopolyurethane resin of the present invention has so excellent elastic properties and low-temperature properties that the resin can maintain the storage modulus (E') at room temperature even in a low-temperature region of −20 to 0° C. Specifically, the storage modulus (E') at 0° C. is increased by 0 to 15% from the storage modulus (E') at room temperature (20° C.). This means that, even at low temperatures, the biopolyurethane resin has elastic properties substantially equivalent to those achieved at room temperature. Further, the biopolyurethane resin of the present invention is an excellent elastic resin such that the resin has, for example, elastic properties, low-temperature properties, and hydrolytic resistance equivalent to those of a polyurethane resin obtained using a tetrahydrofuran/3-alkyltetrahydrofuran polymer.

There is no particular limitation to the method for producing the polyurethane resin of the present invention. The polyurethane resin may be produced by, for example, a known method. For example, it may be produced by a method of charging a polyol and a polyisocyanate compound in a chain extender at a time to perform a reaction. Or, it may be produced by a method, in which a polyol and a polyisocyanate compound are reacted with each other to obtain a prepolymer having a terminal isocyanate group, and then a chain extender is added to the prepolymer to perform an extending reaction.

In the above-mentioned reaction, if necessary, for example, an organometallic catalyst may be added. There is no particular limitation to the organometallic catalyst. Specific examples of organometallic catalysts include organotin catalysts, such as dibutyltin oxide, dibutyltin diacetate, dibutyltin dilaurate, dibutyltin dichloride, and dioctyltin dilaurate; nickel octylate, nickel naphthenate, cobalt octylate, cobalt naphthenate, bismuth octylate, and bismuth naphthenate.

The measurement methods used in the present invention are described below.

[Method for Measuring Number Average Molecular Weight ($M_n$) of Polyol]

The hydroxyl value of polyol was determined in accordance with JIS K1557-1: 2007, and the $M_n$ was calculated.

[Method for Measuring Hardness]

The hardness was determined in accordance with JIS K7312-1996, Type A.

[Evaluation Method for Tensile Strength and Elongation]

A tensile test was conducted with a precision universal tester (Autograph AG-1, manufactured by Shimadzu Corporation), and using a Type 3 dumbbell as a test specimen in accordance with JIS K7312. The measurement was carried out at a temperature of 23° C. and at a humidity of 50%. The tensile strength, elongation at break, 100% modulus, and 300% modulus were determined.

[Evaluation Method for Storage Modulus (E')]

E' was determined with a dynamic viscoelasticity measurement apparatus (DMA7100, manufactured by Hitachi High-Tech Science Corporation) in a tensile mode under conditions such that the temperature was in the range of from −100 to +200° C., the temperature increase rate was 2° C./minute, and the frequency was 10 Hz.

EXAMPLES

Hereinbelow, the present invention will be described with reference to the following examples, which should not be construed as limiting the scope of the present invention.

[Example 1] <Synthesis of Polyol>

Into a 1 L four-neck flask (equipped with a thermometer and a stirrer) were charged 300 parts of tetrahydrofuran and 100 parts of 2-methyltetrahydrofuran (weight ratio: 75/25). While cooling the resultant mixture at 0° C., 10.0 parts of 70% perchloric acid was added thereto. Thereafter, 84 parts of acetic anhydride was added thereto over 30 minutes. The resultant mixture was subjected to further polymerization reaction at 5° C. for 8 hours. 390 Parts of a 17% aqueous solution of sodium hydroxide was added to the reaction mixture. The resultant mixture was stirred at room temperature for 30 minutes. It was allowed to stand overnight, and an aqueous layer, the lower layer, was separated and removed. 52 Parts of a 20% aqueous solution of sodium hydroxide was added to the remaining layer. The monomers were distilled off. 200 Parts of 1-butanol was further added thereto. The resultant mixture was stirred under reflux for 3 hours. It was allowed to stand, and an aqueous layer, the lower layer, was separated and removed. 200 Parts of water was added to the remaining layer. The resultant mixture was stirred under reflux for 30 minutes. It was allowed to stand and an aqueous layer was separated. Then, 200 parts of 1 mol/L hydrochloric acid was added to the remaining layer. The resultant mixture was stirred under reflux for 30 minutes. It was allowed to stand and an aqueous layer was separated. Thereafter, the above-mentioned procedure of washing the aqueous layer with water was repeated until the separated aqueous layer became neutral. 1-Butanol was removed by evaporation under a reduced pressure to obtain a polyether polyol. Table 1 shows the results of the measurement of its yield and number average molecular weight ($M_n$).

[Example 2] <Synthesis of Polyol>

Into a 1 L four-neck flask (equipped with a thermometer and a stirrer) were charged 200 parts of tetrahydrofuran and 200 parts of 2-methyltetrahydrofuran (weight ratio: 50/50). While cooling the resultant mixture at 0° C., 10.0 parts of 70% perchloric acid was added thereto. Thereafter, 84 parts of acetic anhydride was added thereto over 30 minutes. The resultant mixture was further subjected to polymerization reaction at 5° C. for 8 hours. Subsequently, the same procedures as in Example 1 were repeated to obtain a polyether polyol. Table 1 shows the results of the measurement of its yield and number average molecular weight ($M_n$).

[Example 3] <Synthesis of Polyol>

Into a 1 L four-neck flask (equipped with a thermometer and a stirrer) were charged 340 parts of tetrahydrofuran and 60 parts of 2-methyltetrahydrofuran (weight ratio: 85/15). While cooling the resultant mixture at 0° C., 10.2 parts of 70% perchloric acid was added thereto. Thereafter, 86 parts of acetic anhydride was added thereto over 30 minutes. The resultant mixture was further subjected to polymerization reaction at 5° C. for 8 hours. Subsequently, the same procedures as in Example 1 were repeated to obtain a polyether polyol. Table 1 shows the results of the measurement of its yield and number average molecular weight ($M_n$).

[Example 4] <Synthesis of Polyol>

Into a 1 L four-neck flask (equipped with a thermometer and a stirrer) were charged 300 parts of tetrahydrofuran and 100 parts of 2-methyltetrahydrofuran (weight ratio: 75/25). While cooling the resultant mixture at 0° C., 2.4 parts of perchloric acid was added thereto. Thereafter, 91 parts of 25% fuming sulfuric acid was added thereto over 5 hours. The resultant mixture was further subjected to polymerization reaction at 5° C. for one hour. 252 Parts of water was added to the reaction mixture. The resultant mixture was stirred under reflux for one hour. It was allowed to stand, and an aqueous layer, the lower layer, was separated and removed. Further, 195 parts of water was added to the remaining layer. The resultant mixture was stirred under reflux for one hour. It was allowed to stand, and an aqueous layer, the lower layer, was separated and removed. A weakly basic ion-exchange resin (IRA-96SB, manufactured by Organo Corporation) was added to the remaining layer. The resultant mixture was stirred at room temperature for one hour. Then, the resin was separated by filtration, and the monomers were removed therefrom by evaporation under a reduced pressure to obtain a polyether polyol. Table 1 shows the results of the measurement of its yield and number average molecular weight ($M_n$).

[Example 5] <Synthesis of Polyol>

Into a 1 L four-neck flask (equipped with a thermometer and a stirrer) were charged 240 parts of tetrahydrofuran and 160 parts of 2-methyltetrahydrofuran (weight ratio: 60/40). While cooling the resultant mixture at 0° C., 5.6 parts of perchloric acid was added thereto. Thereafter, 137 parts of 25% fuming sulfuric acid was added thereto over 5 hours. The resultant mixture was further subjected to polymerization reaction at 5° C. for one hour. Subsequently, the same procedures as in Example 4 were repeated to obtain a polyether polyol. Table 1 shows the results of the measurement of its yield and number average molecular weight ($M_n$).

[Example 6] <Synthesis of Polyol>

Into a 1 L four-neck flask (equipped with a thermometer and a stirrer) were charged 340 parts of tetrahydrofuran and 60 parts of 2-methyltetrahydrofuran (weight ratio: 85/15). While cooling the resultant mixture at 5° C., 2.3 parts of perchloric acid was added thereto. Thereafter, 77 parts of 25% fuming sulfuric acid was added thereto over 5 hours. The resultant mixture was further subjected to polymerization reaction at 5° C. for one hour. Subsequently, the same procedures as in Example 4 were repeated to obtain a polyether polyol. Table 1 shows the results of the measurement of its yield and number average molecular weight (MO.

Table 1 summarizes the results of syntheses of the polyether polyols in Examples 1 to 6.

TABLE 1

|  |  |  | Example 1 | Example 2 | Example 3 | Example 4 | Example 5 | Example 6 |
|---|---|---|---|---|---|---|---|---|
| Monomer | THF | [% By mass] | 75 | 50 | 85 | 75 | 60 | 85 |
|  | 2MeTHF |  | 25 | 50 | 15 | 25 | 40 | 15 |
| Catalyst | Perchloric acid | [% By mass, based on monomer] | 2.5 | 2.5 | 2.5 | 0.60 | 1.4 | 0.58 |
|  | Acetic anhydride |  | 21.0 | 21.0 | 21.4 | — | — | — |
|  | Fuming sulfuric acid |  | — | — | — | 22.8 | 34.2 | 19.2 |
|  | Yield | [%] | 47 | 22 | 57 | 34 | 19 | 42 |
|  | Number average molecular weight | [—] | 1962 | 1065 | 2248 | 1730 | 1605 | 2114 |

[Example 7] <Synthesis of Polyurethane Resin>

80 Parts of the polyol ($M_n$: 1,962) obtained in Example 1 was placed in a 200 mL separable flask, and subjected to vacuum drying at 100° C. for one hour. 29.8 Parts of MDI was added to the polyol and the resultant mixture was subjected to a reaction at 80° C. for 3 hours to obtain a prepolymer. Then, the obtained prepolymer was deaerated for one hour. 6.5 Parts of 1,4-butanediol was added to the prepolymer and the resultant mixture was stirred for several minutes. Then, it was poured on a preheated glass plate and formed into a sheet having a thickness of 2 mm. The sheet was cured in an oven at 110° C. for 18 hours to obtain a polyurethane resin sheet.

Comparative Example 1

Using polytetramethylene ether glycol (PTG-2000SN, manufactured by Hodogaya Chemical Co., Ltd.; $M_n$: 1,968), a polyurethane resin sheet was obtained by the same procedures as in Example 7.

Comparative Example 2

Using a polyether polyol (PTG-L2000, manufactured by Hodogaya Chemical Co., Ltd.; $M_n$: 1,902), a copolymer of tetrahydrofuran and 3-alkyltetrahydrofuran, a polyurethane resin sheet was obtained by the same procedures as in Example 7.

Using the urethane resin sheets obtained in Example 7 and Comparative Examples 1 and 2, the performance of the urethane resin was evaluated by the above-mentioned Method for measuring hardness, Evaluation method for tensile strength and elongation, and Evaluation method for storage modulus (E'). The results are shown in Table 2 and FIGS. 1 and 2.

TABLE 2

|  |  | Example 7 | Comparative Example 1 | Comparative Example 2 |
|---|---|---|---|---|
| THF-2-Me—THF copolymer | [% By mass] | 68.7 | — | — |
| Polytetramethylene ether glycol |  | — | 68.7 | — |
| THF-3-Alkyl-THF copolymer |  | — | — | 68.4 |
| MDI |  | 25.6 | 25.6 | 25.8 |
| 1,4-Butanediol |  | 5.7 | 5.7 | 5.8 |
| Hardness | JISA | 85 | 86 | 86 |
| 100% Modulus | [MPa] | 5.9 | 6.1 | 6.3 |
| 300% Modulus |  | 11.3 | 12.1 | 11.8 |
| Tensile strength |  | 28.8 | 36.8 | 30.1 |
| Elongation at break | [%] | 549 | 515 | 532 |
| Storage modulus | −20° C. [MPa] | 49 | 67 | 61 |
|  | 0° C. | 26 | 47 | 28 |
|  | 20° C. | 23 | 25 | 25 |

[Example 8] <Synthesis of Polyurethane Resin>

100 Grams of the polyol ($M_n$: 1,730) obtained in Example 4 was placed in a 200 mL separable flask, and subjected to vacuum drying at 100° C. for one hour. 29.9 Grams of MDI was added to the polyol and the resultant mixture was subjected to a reaction at 80° C. for 3 hours to obtain a prepolymer. Then, the obtained prepolymer was deaerated for one hour. 5.3 Grams of 1,4-butanediol was added to the prepolymer and the resultant mixture was stirred for several minutes. Then, it was poured on a preheated glass plate and formed into a sheet having a thickness of 2 mm. The sheet was cured in an oven at 110° C. for 18 hours to obtain a polyurethane resin sheet.

Comparative Example 3

Using polytetramethylene ether glycol (PTG-2000SN, manufactured by Hodogaya Chemical Co., Ltd.; $M_n$: 1,951), a polyurethane resin sheet was obtained by the same procedures as in Example 8.

Comparative Example 4

Using a polyether polyol (PTG-L2000, manufactured by Hodogaya Chemical Co., Ltd.; $M_n$: 1,979), a copolymer of tetrahydrofuran and 3-alkyltetrahydrofuran, a polyurethane resin sheet was obtained by the same procedures as in Example 8.

Figure 3:
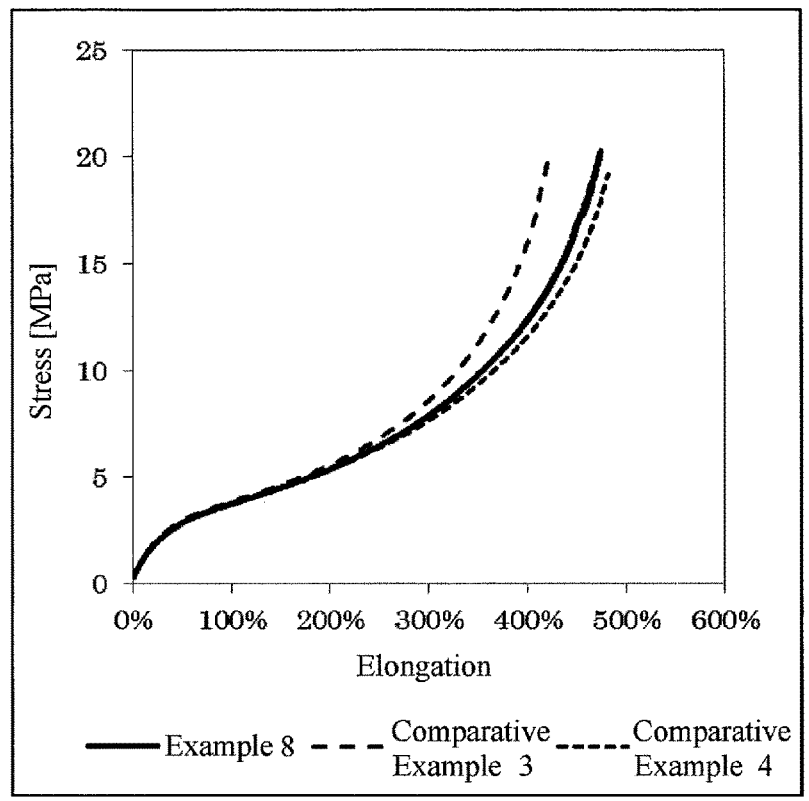
FIG. 3 shows the results of the evaluation of a tensile strength and an elongation with respect to the polyurethane resins in Example 8 and Comparative Examples 3 and 4.

By the above-mentioned Method for measuring hardness, Evaluation method for tensile strength and elongation, and Evaluation method for storage modulus (E'), the urethane resin sheets obtained in Example 8 and Comparative Examples 3 and 4 were evaluated. The results of the evaluation, the stress-strain curves, and the storage modulus curves are respectively shown in Table 3 and FIGS. 3 and 4.

TABLE 3

|  |  | Example 8 | Comparative Example 3 | Comparative Example 4 |
|---|---|---|---|---|
| THF-2-Me—THF copolymer | [% By mass] | 74.0 | — | — |
| Polytetramethylene ether glycol |  | — | 75.0 | — |
| THF-3-Alkyl-THF copolymer |  | — | — | 75.2 |
| MDI |  | 22.1 | 21.1 | 20.9 |
| 1,4-Butanediol |  | 3.9 | 3.9 | 3.9 |
| Hardness | JISA | 76 | 78 | 77 |
| 100% Modulus | [MPa] | 3.7 | 3.8 | 3.7 |
| 300% Modulus |  | 7.8 | 8.5 | 7.6 |
| Tensile strength |  | 19.5 | 18.8 | 19.2 |
| Elongation at break | [%] | 474 | 420 | 482 |
| Storage modulus | −20° C. [MPa] | 11 | 31 | 11 |
|  | 0° C. | 10 | 19 | 10 |
|  | 20° C. | 10 | 11 | 10 |

Figure 2:
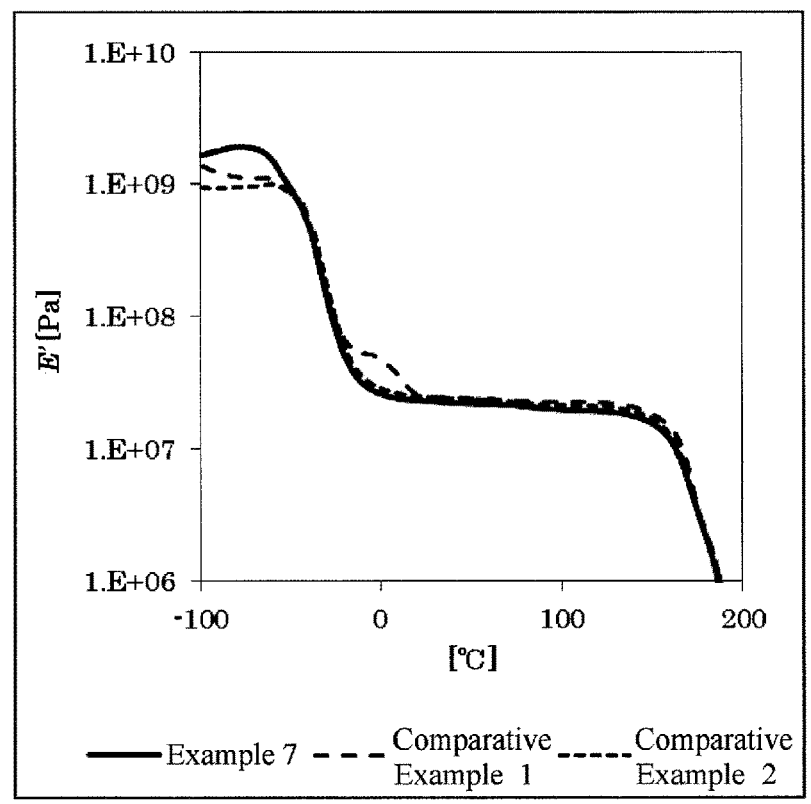
FIG. 2 shows the results of the evaluation of a storage modulus (E') with respect to the polyurethane resins in Example 7 and Comparative Examples 1 and 2.
Figure 4:
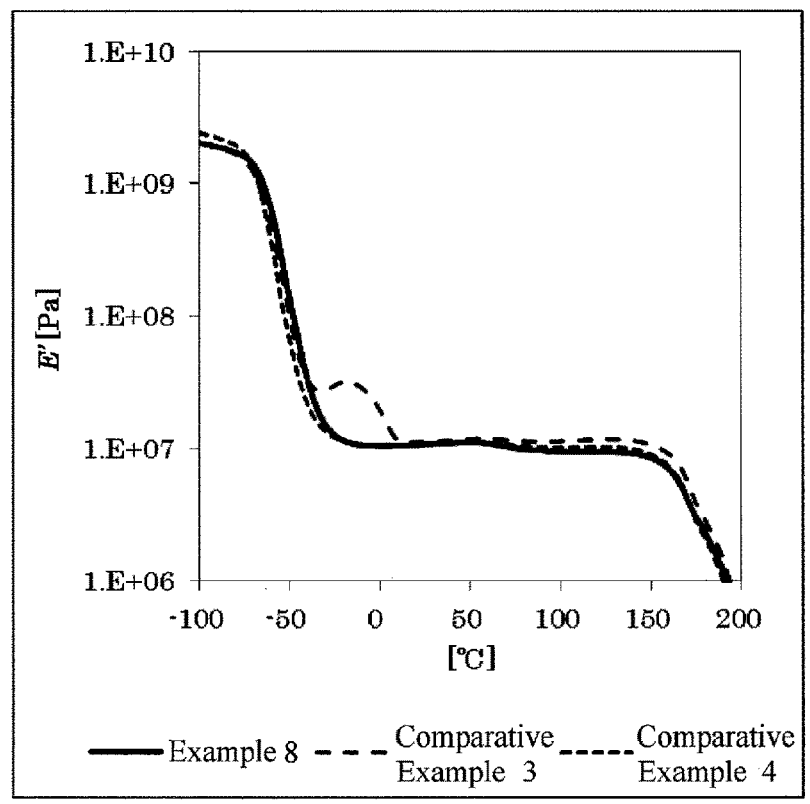
FIG. 4 shows the results of the evaluation of a storage modulus (E') with respect to the polyurethane resins in Example 8 and Comparative Examples 3 and 4.

FIGS. 2 and 4 demonstrate that the modulus in low-temperature region of the polyurethane resin according to the present invention was changed only by 0 to 15% from the modulus at room temperature (20° C.). Also, FIG. 1 demonstrates that, when having a high hard segment ratio, the polyurethane resin exhibited a behavior that was more flexible than a known copolymer of tetrahydrofuran and 3-alkyltetrahydrofuran. That is, the polyol of the present invention, although it is of 100% plant origin, can provide a biopolyurethane resin having excellent elastic properties and excellent low-temperature properties.

INDUSTRIAL APPLICABILITY

The polyether polyol of the present invention can be produced from a 100% plant origin raw material. Further, a biopolyurethane resin produced using the polyether polyol of the present invention exhibits excellent elastic properties and excellent low-temperature properties comparable to those of the conventional petroleum-derived products. Particularly, as the hard segment ratio increases, the biopolyurethane resin exhibits more remarkable flexibility than the conventional petroleum-derived products, and therefore it can be advantageously used in various industrial fields.

The invention claimed is:

1. A method for producing a biopolyether polyol, comprising the step of producing a plant origin polyether polyol from a copolymerization reaction of a monomer mixture of tetrahydrofuran monomers and 2-methyltetrahydrofuran monomers, wherein the tetrahydrofuran monomers and 2-methyltetrahydrofuran monomers are monomers of 100% plant origin, and wherein a monomer ratio by mass of the tetrahydrofuran to the 2-methyltetrahydrofuran ranges 85/15 to 50/50 wherein the biopolyether polyol has a number average molecular weight of 500 to 5,000.

2. The method for producing a biopolyether polyol according to claim 1, wherein the copolymerization reaction is carried out by adding a strong acid catalyst in an amount of 15 to 40% by mass based on a total mass of the tetrahydrofuran and 2-methyltetrahydrofuran.

3. The method for producing a biopolyether polyol according to claim 1, wherein the copolymerization reaction is carried out by mixing the monomers in a monomer ratio by mass within the range of from 85/15 to 50/50, and charging a strong acid catalyst thereinto while maintaining a temperature within the range of from 0 to 50° C.

4. The method for producing a biopolyether polyol according to claim 2, wherein the strong acid catalyst is acetic anhydride, perchloric acid, fluorosulfonic acid, or fuming sulfuric acid.

5. A 100% plant origin polyether polyol, which is a product of a copolymerization reaction of a monomer mixture of 100% plant origin tetrahydrofuran monomers and 2-methyltetrahydrofuran monomers, having a monomer ratio by mass of the tetrahydrofuran and the 2-methyltetrahydrofuran of 85/15 to 50/50, and a number average molecular weight of 500 to 5,000.

6. A biopolyurethane resin, which is a polyurethane resin that is a product of a synthesis reaction of:
a polyether polyol, which is a product of a copolymerization reaction of a monomer mixture of tetrahydrofuran monomers and 2-methyltetrahydrofuran monomers, wherein the tetrahydrofuran and 2-methyltetrahydrofuran are monomers of 100% plant origin, and wherein a monomer ratio by mass of the tetrahydrofuran and the 2-methyltetrahydrofuran ranges 85/15 to 50/50 and wherein the biopolyether polyol has a number average molecular weight of 500 to 5,000;
a polyisocyanate compound; and
a chain extender capable of reacting with an isocyanate group of the polyisocyanate compound;
as main reactants,
wherein the biopolyurethane resin comprises plant origin components in an amount of 50 to 80% by mass, relative to 100% by mass of the polyurethane resin.

7. The biopolyurethane resin according to claim 6, wherein the polyether polyol is a 100% plant origin polyether polyol and has a number average molecular weight of 500 to 5,000.

8. The biopolyurethane resin according to claim 6, which shows an increase in storage modulus (E') in a low-temperature region at 0° C. with respect to room temperature (20° C.) of within 0 to 15%.

* * * * *